(12) United States Patent
Lee et al.

(10) Patent No.: US 9,459,505 B2
(45) Date of Patent: Oct. 4, 2016

(54) DISPLAY DEVICE AND MANUFACTURING METHOD THEREOF

(71) Applicant: SAMSUNG DISPLAY CO., LTD., Yongin, Gyeonggi-Do (KR)

(72) Inventors: Bong-Jun Lee, Seoul (KR); Ji Young Jeong, Cheonan-si (KR); Seul Ki Kim, Anyang-si (KR); Ju Hyeon Baek, Asan-si (KR); Kyung-Seob Choi, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 23 days.

(21) Appl. No.: 14/486,378

(22) Filed: Sep. 15, 2014

(65) Prior Publication Data

US 2015/0268528 A1  Sep. 24, 2015

(30) Foreign Application Priority Data

Mar. 19, 2014  (KR) ........................ 10-2014-0032369

(51) Int. Cl.
*G02F 1/1343*  (2006.01)
*G02F 1/1362*  (2006.01)
*G02F 1/1337*  (2006.01)

(52) U.S. Cl.
CPC ... *G02F 1/136286* (2013.01); *G02F 1/134309* (2013.01); *G02F 1/133707* (2013.01); *G02F 2001/134318* (2013.01)

(58) Field of Classification Search
CPC .................... G02F 1/136286; G02F 1/1343
See application file for complete search history.

(56) References Cited

U.S. PATENT DOCUMENTS

| 6,999,140 B2 | 2/2006 | Tanaka et al. | |
|---|---|---|---|
| 7,130,009 B2 | 10/2006 | Saigo et al. | |
| 2004/0189917 A1* | 9/2004 | Tanaka .............. | G06F 1/134363 349/141 |
| 2006/0164352 A1* | 7/2006 | Yoo ...................... | G02F 1/13624 345/87 |
| 2007/0242203 A1* | 10/2007 | Lee .................... | G02F 1/134363 349/141 |
| 2009/0225250 A1* | 9/2009 | Lyu .................... | G02F 1/134363 349/44 |
| 2012/0257155 A1 | 10/2012 | Lee et al. | |
| 2013/0077031 A1* | 3/2013 | Kim .................... | G02F 1/13394 349/106 |
| 2013/0162570 A1* | 6/2013 | Shin ........................ | G06F 3/041 345/173 |
| 2014/0267962 A1* | 9/2014 | Jung .................. | G02F 1/134363 349/33 |
| 2014/0285478 A1* | 9/2014 | Ono ...................... | G09G 3/3614 345/209 |
| 2015/0268795 A1* | 9/2015 | Kurasawa ............... | G06F 3/044 345/174 |
| 2016/0011466 A1* | 1/2016 | Choi ................. | G02F 1/133345 257/72 |

FOREIGN PATENT DOCUMENTS

| JP | 2002-365656 | 12/2002 |
|---|---|---|
| KR | 1020060073826 | 6/2006 |
| KR | 100914194 | 8/2009 |
| KR | 1020100075023 | 7/2010 |

\* cited by examiner

Primary Examiner — Sang V Nguyen
(74) Attorney, Agent, or Firm — F. Chau & Associates, LLC.

(57) ABSTRACT

A display device includes a first insulation substrate, a gate line disposed on the first insulation substrate, a semiconductor layer disposed on the gate line, a data line insulated from and crossing the gate line and including a source electrode and a drain electrode facing the source electrode, a first insulating layer disposed on the source electrode and the drain electrode, a pixel electrode electrically connected to the drain electrode, a second insulating layer disposed on the pixel electrode, a common electrode disposed on the second insulating layer, and a shielding pattern part disposed on a same layer as the pixel electrode and overlapping the data line.

19 Claims, 12 Drawing Sheets

DISPLAY DEVICE AND MANUFACTURING METHOD THEREOF

CROSS-REFERENCE TO RELATED APPLICATIONS

This application claims priority under 35 U.S.C. §119 to Korean Patent Application No. 10-2014-0032369 filed on Mar. 19, 2014, the disclosure of which is hereby incorporated by reference in its entirety.

TECHNICAL FIELD

Exemplary embodiments of the present invention relate to a display device and a manufacturing method thereof.

DISCUSSION OF THE RELATED ART

A liquid crystal display, which is currently one of the most widely used flat panel displays, includes two display panels on which electric field generating electrodes, such as a pixel electrode and a common electrode, are formed. A liquid crystal layer is disposed between the two display panels. The liquid crystal display displays an image by generating an electric field on the liquid crystal layer by applying a voltage to the electric field generating electrodes, controlling directions of liquid crystal molecules of the liquid crystal layer, and controlling polarization of incident light through the generated electric field. One of the display panels is a thin film transistor array panel. The thin film transistor array panel typically includes a gate line, a data line, a pixel electrode, and a thin film transistor, and the other display panel typically includes a color filter and a light blocking member.

SUMMARY

Exemplary embodiments of the present invention provide a thin film transistor array panel including a shielding pattern part that shields a short that may be generated by a pinhole, while also obtaining a high aperture ratio.

According to an exemplary embodiment of the present invention, a display device includes a first insulation substrate, a gate line disposed on the first insulation substrate, a semiconductor layer disposed on the gate line, a data line insulated from and crossing the gate line and including a source electrode and a drain electrode facing the source electrode, a first insulating layer disposed on the source electrode and the drain electrode, a pixel electrode electrically connected to the drain electrode, a second insulating layer disposed on the pixel electrode, a common electrode disposed on the second insulating layer, and a shielding pattern part disposed on a same layer as the pixel electrode and overlapping the data line.

In an exemplary embodiment, a shape of the data line and a shape of the shielding pattern part may be substantially similar.

In an exemplary embodiment, a width of the shielding pattern part may be larger than a width of the data line.

In an exemplary embodiment, the display device may further include a second insulation substrate separated from and facing the first insulation substrate, a light blocking member and a color filter disposed on the second insulation substrate, and a liquid crystal layer injected between the first insulation substrate and the second insulation substrate.

In an exemplary embodiment, the common electrode may include a shielding electrode, and the shielding electrode may overlap the light blocking member and the data line.

In an exemplary embodiment, the width of the shielding electrode may be wider than the width of the light blocking member.

In an exemplary embodiment, one of the pixel electrode and the common electrode may have a planar shape and the other may have a branch shape.

In an exemplary embodiment, the shielding pattern part may be independently disposed on each pixel in the display device.

In an exemplary embodiment, the shielding pattern part may be a transparent conductive oxide (TCO).

According to an exemplary embodiment of the present invention, a manufacturing method of a display device includes forming a gate line on a first insulation substrate, forming a gate insulating layer on the gate line, forming a semiconductor layer on the gate insulating layer, forming a data line including a source electrode and a drain electrode on the semiconductor layer, depositing and etching a first insulating layer including an opening on the data line and the drain electrode, depositing a first conductive layer on the first insulating layer and the opening, and etching the first conductive layer to form a pixel electrode connected to the drain electrode and to form a shielding pattern part overlapping the data line.

In an exemplary embodiment, the method may further include depositing a second insulating layer on the pixel electrode and the shielding pattern part, and forming a common electrode on the second insulating layer.

In an exemplary embodiment, the shape of the shielding pattern part may be formed to be substantially similar to that of the data line.

In an exemplary embodiment, the width of the shielding pattern part may be formed to be larger than the width of the data line.

In an exemplary embodiment, the method may further include forming a light blocking member and a color filter on a second insulation substrate separated from and facing the first insulation substrate, and injecting liquid crystal molecules between the first insulation substrate and the second insulation substrate.

In an exemplary embodiment, the common electrode may be formed to include a shielding electrode overlapping the light blocking member and the data line.

In an exemplary embodiment, the width of the shielding electrode may be formed to be wider than the width of the light blocking member.

In an exemplary embodiment, one of the pixel electrode and the common electrode may have a planar shape and the other may have a branch shape.

In an exemplary embodiment, the shielding pattern part may be formed to be independently disposed on each pixel in the display device.

In an exemplary embodiment, the shielding pattern part may be a transparent conductive oxide (TCO).

According to an exemplary embodiment of the present invention, a display device includes a first insulation substrate, a second insulation substrate separated from and facing the first insulation substrate, a data line, a pixel electrode electrically connected to the data line, a common electrode including a shielding electrode, a light blocking member disposed on the second insulation substrate, and a shielding pattern part disposed on a same layer as the pixel electrode and overlapping the data line. A shape of the data line and a shape of the shielding pattern part are substantially similar in a plan view, a width of the shielding pattern part is larger than a width of the data line in the plan view, the shielding pattern part completely covers the data line in the plan view, and a width of the shielding electrode is larger than a width of the light blocking member in an area in which the shielding electrode overlaps the data line and the light blocking member.

According to exemplary embodiments of the present invention, the data line and the common electrode may be prevented from being shorted by a pinhole that may be generated during the manufacturing process. As a result, a display device having improved reliability may be provided.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
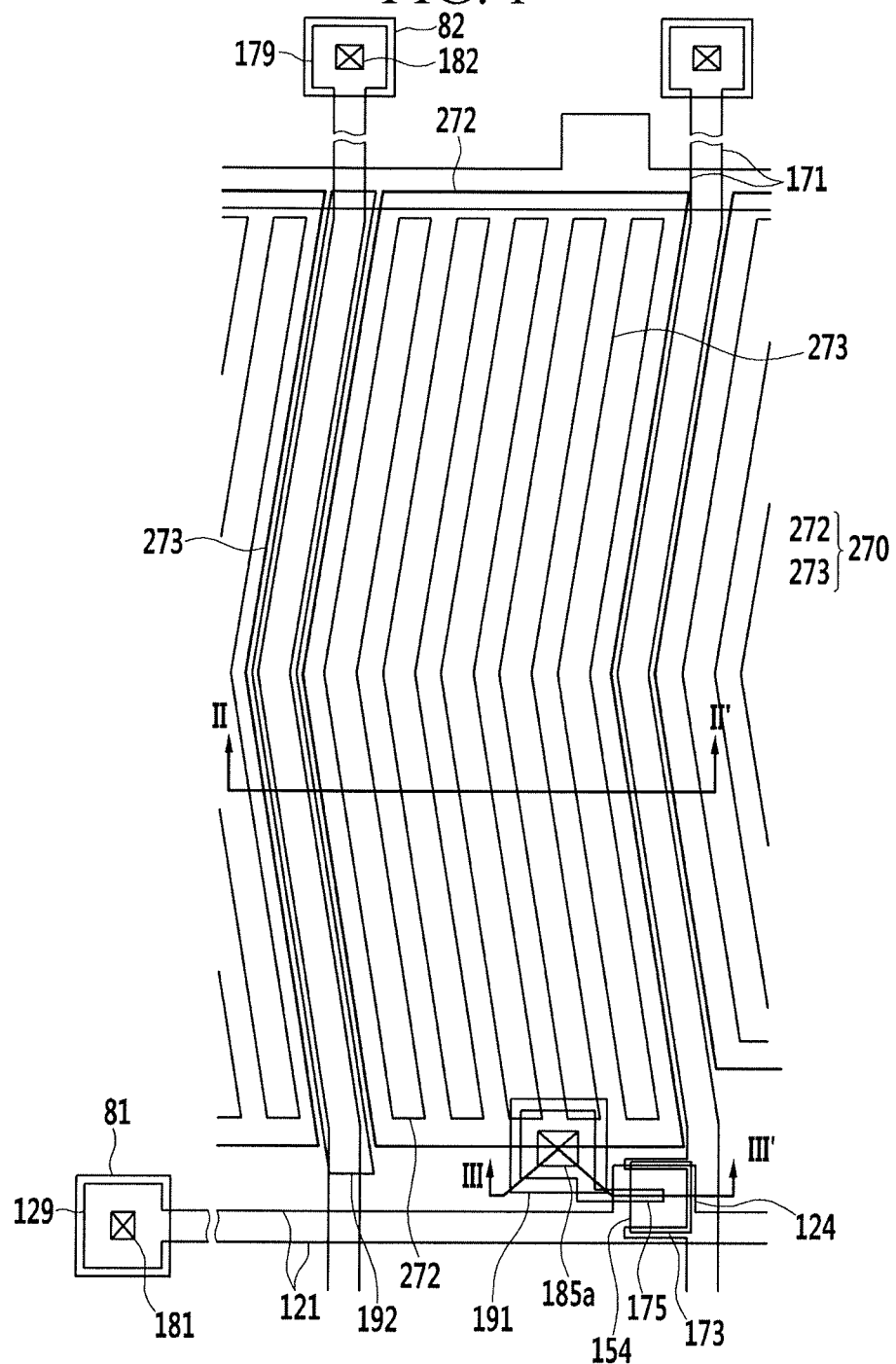
FIG. 1 is a plan view of a pixel of a display device according to an exemplary embodiment of the present invention.

Exemplary embodiments of the present invention will be described more fully hereinafter with reference to the accompanying drawings.

In the drawings, the thickness of layers, films, panels, regions, etc., may be exaggerated for clarity. Like reference numerals may refer to like elements throughout the accompanying drawings. It will be understood that when an element such as a layer, film, region, or substrate is referred to as being "on" another element, it can be directly on the other element or intervening elements may also be present.

Hereinafter, a display device according to exemplary embodiments of the present invention will be described with reference to the accompanying drawings.

Figure 2:
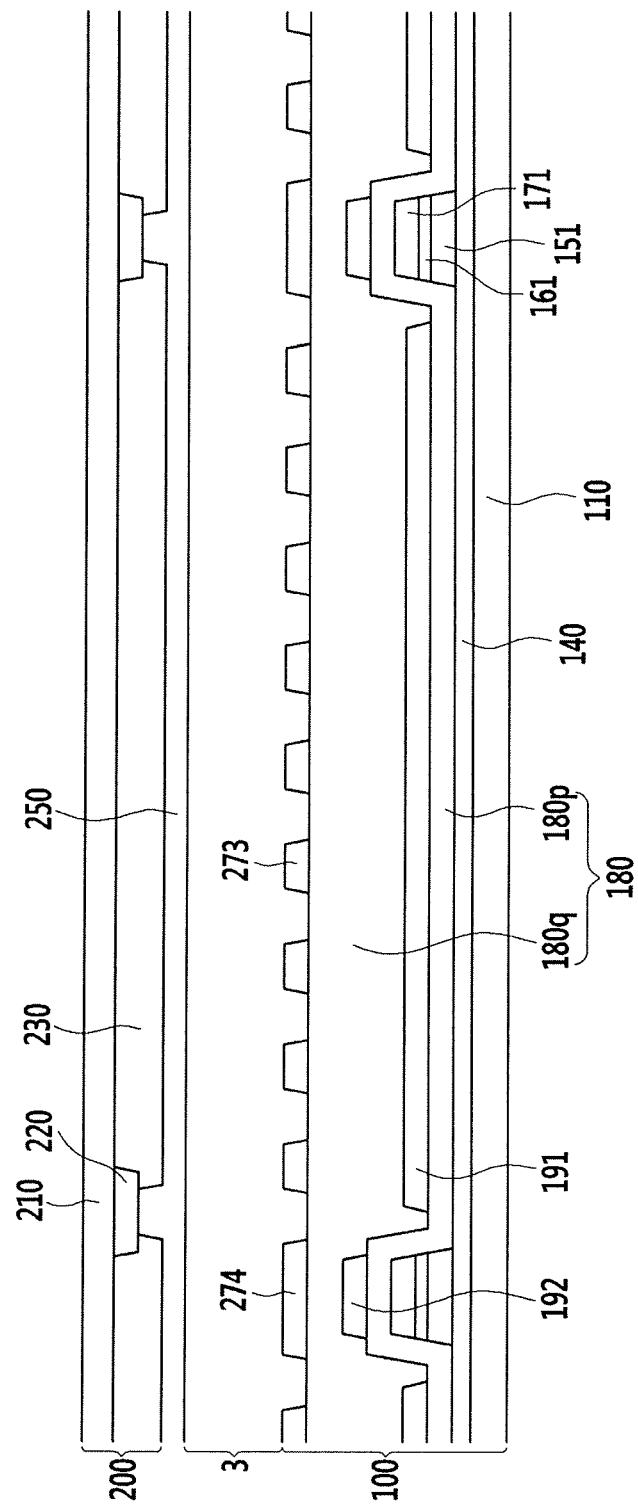
FIG. 2 is a cross-sectional view taken along line II-II' of FIG. 1 according to an exemplary embodiment of the present invention.
Figure 3:
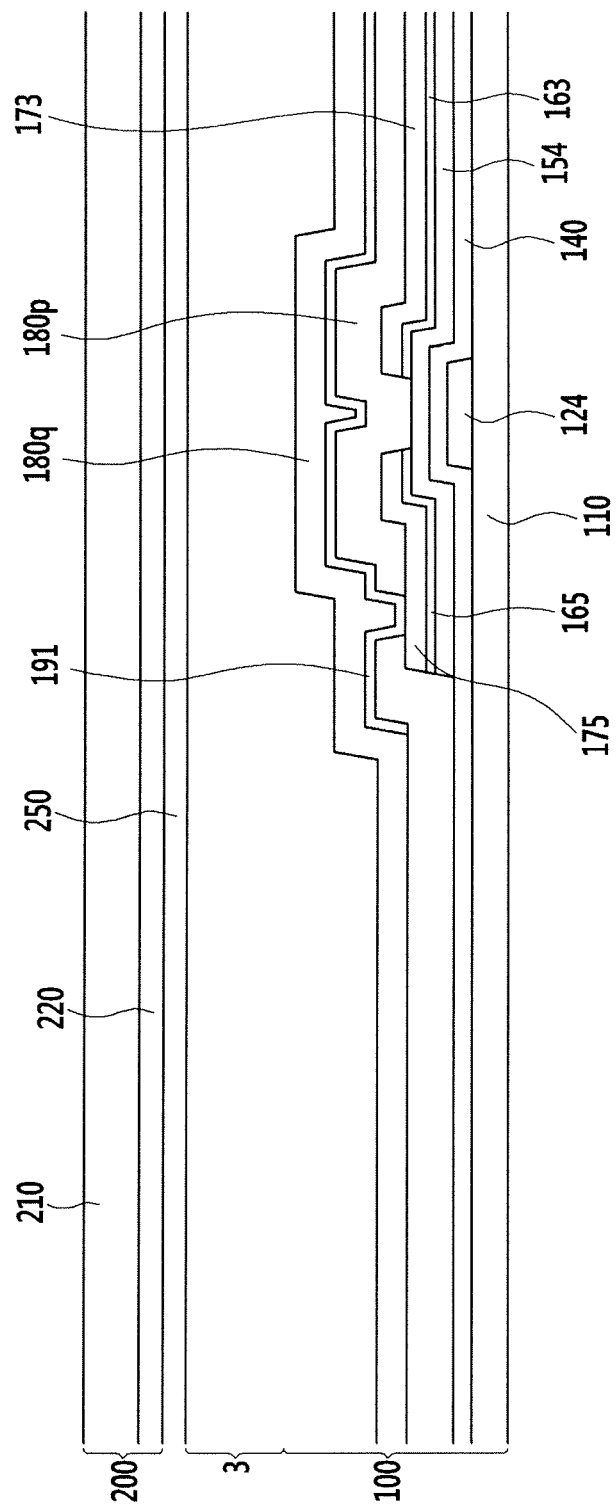
FIG. 3 is a cross-sectional view taken along line of FIG. 1 according to an exemplary embodiment of the present invention.

FIG. 1 is a plan view of a pixel of a display device according to an exemplary embodiment of the present invention. FIG. 2 is a cross-sectional view taken along line II-II' of FIG. I according to an exemplary embodiment of the present invention. FIG. 3 is a cross-sectional view taken along line of FIG. 1 according to an exemplary embodiment of the present invention.

Referring to FIGS. 1 to 3, a display device according to an exemplary embodiment of the present invention includes a lower panel 100, an upper panel 200 facing the lower panel 100, and a liquid crystal layer 3 interposed between the lower panel 100 and the upper panel 200. Herein, the lower panel 100 may be referred to as a thin film transistor array panel 100.

First, the thin film transistor array panel 100 will be described.

A gate conductor including a gate line 121 is disposed on a first insulation substrate 110. The first insulation substrate 110 may be made of, for example, transparent glass, plastic, etc.

The gate line 121 includes a gate electrode 124 and a wide gate pad 129 for connection with another layer or an external driving circuit.

The gate line 121 may be made of an aluminum-based metal such as, for example, aluminum (Al) or an aluminum alloy, a silver-based metal such as, for example, silver (Ag) or a silver alloy, a copper-based metal such as, for example, copper (Cu) or a copper alloy, a molybdenum-based metal such as, for example, molybdenum (Mo) or a molybdenum alloy, chromium (Cr), tantalum (Ta), or titanium (Ti). However, the gate line 121 is not limited thereto. In addition, the gate line 121 may have a multilayered structure including at least two conductive layers having the same or different physical properties.

A gate insulating layer 140 made of, for example, a silicon nitride (SiNx), a silicon oxide (SiOx), etc. may be formed on the gate conductor (e.g., the gate line 121, the gate electrode 124, and the wide gate pad 129). The gate insulating layer 140 may have a multilayered structure including at least two insulating layers having different physical properties.

A semiconductor 151 and 154 made of, for example, amorphous silicon, polysilicon, etc., is formed on the gate insulating layer 140. The semiconductor 151 and 154 may also be referred to herein as a semiconductor layer. The semiconductor 151 and 154 may be disposed on the gate line 121. The semiconductor 151 and 154 may include, for example, an oxide semiconductor as well as amorphous silicon or polysilicon as described above.

Ohmic contacts 161, 163 and 165 may be disposed on the semiconductor 151 and 154. The ohmic contacts 161, 163 and 165 may be made of a material such as, for example, n+ hydrogenated amorphous silicon in which an n-type impurity such as, for example, phosphorus is doped at a high concentration, or of a silicide.

The ohmic contacts 161, 163 and 165 may be disposed as a pair on the semiconductor 151 and 154. In exemplary embodiments (e.g., exemplary embodiments in which the semiconductor 151 and 154 is an oxide semiconductor), the ohmic contacts 161, 163 and 165 may be omitted.

A data conductor including a data line 171 including a source electrode 173 and a drain electrode 175 is positioned on the ohmic contacts 161, 163 and 165 and the gate insulating layer 140. The data line 171 is insulated from and crosses the gate line 121.

The data line 171 includes a data pad 179 for connection with another layer or an external driving circuit. The data line 171 transfers a data signal and extends substantially in a vertical direction such that it crosses the gate line 121.

The source electrode 173 is a part of the data line 171, and is disposed on the same line as the data line 171. The drain electrode 175 is formed to extend substantially parallel to the source electrode 173. Accordingly, the drain electrode 175 is substantially parallel to a part of the data line 171.

The drain electrode 175 includes a first end portion and a second end portion. The first end portion may be a rod-shaped end portion which faces the source electrode 173 based on the gate electrode 124, and the second end portion may have a large area.

The gate electrode 124, the source electrode 173, and the drain electrode 175 together form one thin film transistor (TFT) with the semiconductor 151 and 154. A channel of the thin film transistor is formed in the semiconductor 151 and 154 between the source electrode 173 and the drain electrode 175.

A thin film transistor array panel 100 according to an exemplary embodiment of the present invention includes the source electrode 173 positioned on the same line as the data line 171, and the drain electrode 175 extending substantially parallel to the data line 171. As a result, according to an exemplary embodiment, even though an area occupied by the data conductor is not increased, a width of the thin film transistor may be increased, thereby increasing an aperture ratio of the liquid crystal display.

However, exemplary embodiments of the present invention are not limited thereto. For example, referring to the thin film transistor array panel 100 according to exemplary embodiments, the source electrode 173 and the drain electrode 175 may have different shapes.

The data line 171 and the drain electrode 175 may be made of a refractory metal such as, for example, molybdenum, chromium, tantalum, and titanium, or an alloy thereof, and may have a multilayered structure including, for example, a refractory metal layer and a low resistance conductive layer. An example of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer. However, the data line 171 and the drain electrode 175 are not limited thereto, and may be made of various other metals as well as conductors other than the metals.

An insulating layer 180 includes a first insulating layer 180$p$ and a second insulating layer 180$q$. The first insulating layer 180$p$ is disposed on the data conductors (e.g., the data line 171, the source electrode 173, the drain electrode 175, and the data pad 179), the gate insulating layer 140, and an exposed portion of the semiconductor 151 and 154. The first insulating layer 180$p$ may be made of, for example, an organic insulating material or an inorganic insulating material.

The first insulating layer 180$p$ may include a plurality of openings. The plurality of openings may be disposed at a position exposing a part of the drain electrode 175, or exposing the wide gate pad 129 and the data pad 179.

According to exemplary embodiments of the present invention, the thin film transistor array panel 100 may or may not include an organic layer.

A pixel electrode 191 and a shielding pattern part 192 are formed on the first insulating layer 180$p$.

The pixel electrode 191 and the shielding pattern part 192 may be made of, for example, a transparent conductive oxide (TCO) such as, for example, indium tin oxide (ITO) or indium zinc oxide (IZO).

The pixel electrode 191 is disposed at an opening included in the first insulating layer 180$p$, thereby being physically and electrically connected to the drain electrode 175 to receive a voltage from the drain electrode 175. According to an exemplary embodiment, the pixel electrode 191 may have a planar shape, however the shape of the pixel electrode 191 is not limited thereto.

A first contact assistant 81 is disposed on the wide gate pad 129 exposed through a first contact hole 181 and an opening of the first insulating layer 180$p$ corresponding thereto, and a second contact assistant 82 is disposed on the data pad 179 exposed through a second contact hole 182 and an opening of the first insulating layer 180$p$ corresponding thereto. In an exemplary embodiment, the pixel electrode 191, the first contact assistant 81, and the second contact assistant 82 may be simultaneously formed.

The shielding pattern part 192 may be formed along with the pixel electrode 191, and may be formed on a same layer as the pixel electrode 191. The shielding pattern part 192 is formed such that it overlaps the data line 171, as shown in FIG. 2.

The shielding pattern part 192 may be formed during etching to form the pixel electrode 191 after depositing a conducting layer. The shielding pattern part 192 may have a shape that is substantially similar to the shape of the data line 171. For example, according to an exemplary embodiment, in a plan view (e.g., a top-down view), the shape of the shielding pattern 192 may correspond to the shape of the data line 171, as shown in FIG. 1. That is, in an exemplary embodiment, the shape of the shielding pattern 192 may be the same as the shape of the data line 171 in a plan view. In an exemplary embodiment, the shielding pattern part 192 may extend in a length direction (e.g., in a vertical direction in which the data line 171 also extends) and may be independently disposed for each pixel, as shown in FIG. 1, thereby reducing load generation even though the shielding pattern part 192 is connected with a common electrode 270.

In an exemplary embodiment, the width of the shielding pattern part 192 may be wider than the width of the data line 171. In an exemplary embodiment, the shielding pattern part 192 may completely cover the data line 171 such that contact between the data line 171 and the common electrode 270 may be prevented.

The second insulating layer 180$q$ is disposed on the pixel electrode 191 and the shielding pattern part 192. The second insulating layer 180$q$ may be formed of, for example, the same or a similar material as the first insulating layer 180$p$.

A common electrode 270 is disposed on the second insulating layer 180$q$. The common electrode 270 may be formed of a transparent conductive layer such as, for example, ITO or IZO. However, the common electrode 270 it is not limited thereto. For example, the common electrode 270 may be formed of any transparent conductive oxide (TCO).

The common electrode 270 may include a plurality of branch shapes. For example, the common electrode 270 may include a plurality of branch electrodes 273 extending substantially parallel to each other and separated from each other, and lower and upper transverse portions 272 connecting upper and lower ends of the branch electrodes 273.

In the exemplary embodiment shown in FIG. 1, the common electrode 270 includes the branch electrodes 273 and the pixel electrode 191 has a planar shape. However, exemplary embodiments are not limited thereto. For example, in an exemplary embodiment, the pixel electrode 191 may include the branch electrodes 273 and the common electrode 270 may have a planar shape.

The common electrode 270 may further include a shielding electrode 274 overlapping the light blocking member 220 and the data line 171, as shown in FIG. 2.

The shielding electrode 274 may reduce the width of a light blocking member 220 while overlapping the data line 171 and the light blocking member 220, thereby improving the aperture ratio. The shielding electrode 274 may be wider than the light blocking member 220 in areas in which it overlaps the data line 171 and the light blocking member 220, and may also be wider than the data line 171 in other areas.

An alignment layer may be coated on the pixel electrode 191 and the common electrode 270. The alignment layer may be, for example, a horizontal alignment layer. When the alignment layer is a horizontal alignment layer, the alignment layer may be rubbed in a predetermined direction. However, the alignment layer is not limited thereto. For example, according to exemplary embodiments of the present invention, the alignment layer may include a photoreactive material to be photoaligned.

The upper panel 200 will now be described.

The light blocking member 220 is formed on a second insulation substrate 210. The second insulation substrate 210 may be made of, for example, transparent glass, plastic, etc. The light blocking member 220 may also be referred to herein as a black matrix. The light blocking member 220 may prevent light leakage. In an exemplary embodiment, to prevent a decrease of the aperture ratio by the light blocking member 220, the width of the light blocking member 220 may be smaller than the width of the shielding electrode 274. The second insulation substrate 210 may be separated from and may face the first insulation substrate 110.

A color filter(s) 230 is formed on the second insulation substrate 210.

An overcoat 250 may be formed on the color filter 230 and the light blocking member 220. The overcoat 250 may be made of, for example, an organic insulator, and may prevent the color filter 230 from being exposed. The overcoat may also provide a substantially flat surface. In exemplary embodiments of the present invention, the overcoat 250 may be omitted.

An alignment layer, as described above, may be disposed on the overcoat 250.

The liquid crystal layer 3 includes a nematic liquid crystal material having positive dielectric anisotropy. Liquid crystal molecules of the liquid crystal layer 3 are arranged such that a long axis direction thereof is substantially parallel to the lower and upper panels 100 and 200. The liquid crystal layer has a spiral structure in which the direction thereof is twisted by about 90° from the rubbing direction of the alignment layer of the thin film transistor array panel 100 to the upper panel 200.

The pixel electrode 191 receives a data voltage from the drain electrode 175, and the common electrode 270 receives a common voltage having a predetermined magnitude from a common voltage applying unit disposed external to the display area.

The pixel electrode 191 and the common electrode 270, which are field generating electrodes, generate an electric field. As a result, the liquid crystal molecules of the liquid crystal layer 3 positioned on the two electrodes 191 and 270 rotate in a direction substantially parallel to the direction of the electric field. Polarization of light passing through the liquid crystal layer varies according to the determined rotation directions of the liquid crystal molecules.

In an exemplary embodiment, the display device having the shielding pattern part 192, the common electrode 270 and the data line 171 may be prevented from being shorted by a pinhole or a foreign material that may be generated in the insulating layer 180 during the manufacturing process. As a result, a display device having improved reliability and stability may be provided.

Figure 4:
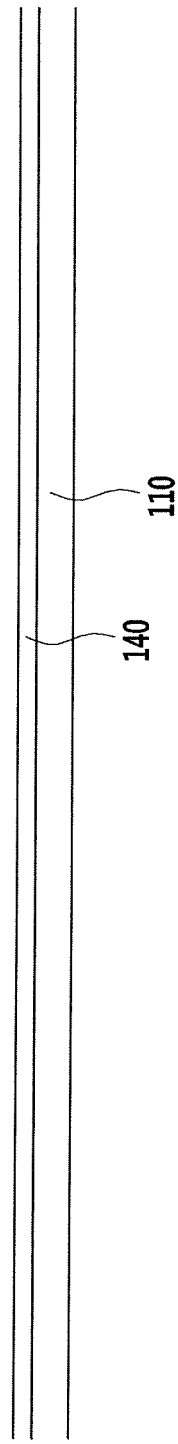
FIGS. 4, 6, and 8 are cross-sectional views taken along line II-II' of FIG. 1 during a manufacturing process according to an exemplary embodiment of the present invention.
Figure 5:
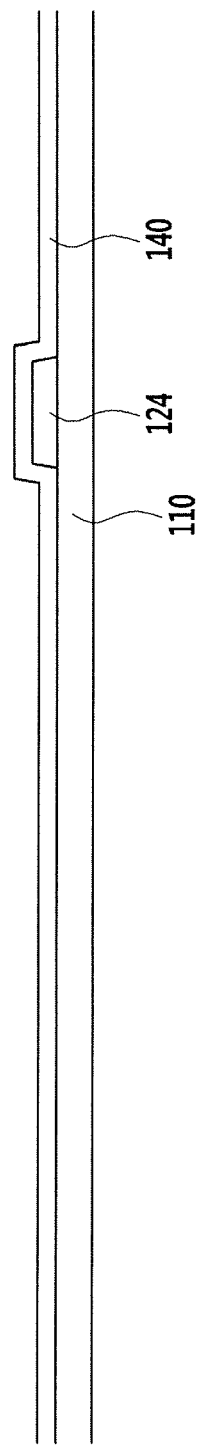
FIGS. 5, 7, and 9 are cross-sectional views taken along line of FIG. 1 during a manufacturing process according to an exemplary embodiment of the present invention.
Figure 6:
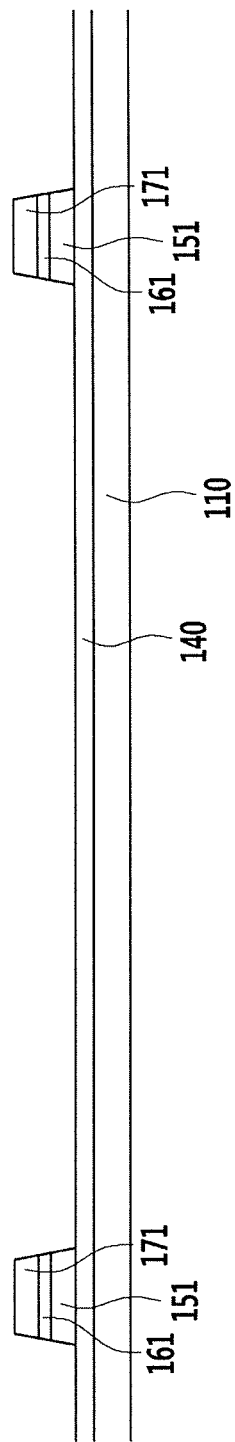
Figure 7:
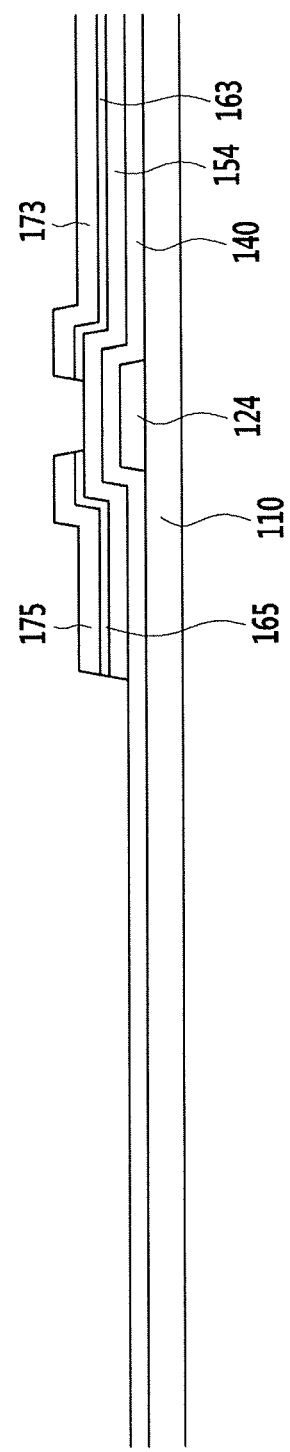
Figure 8:
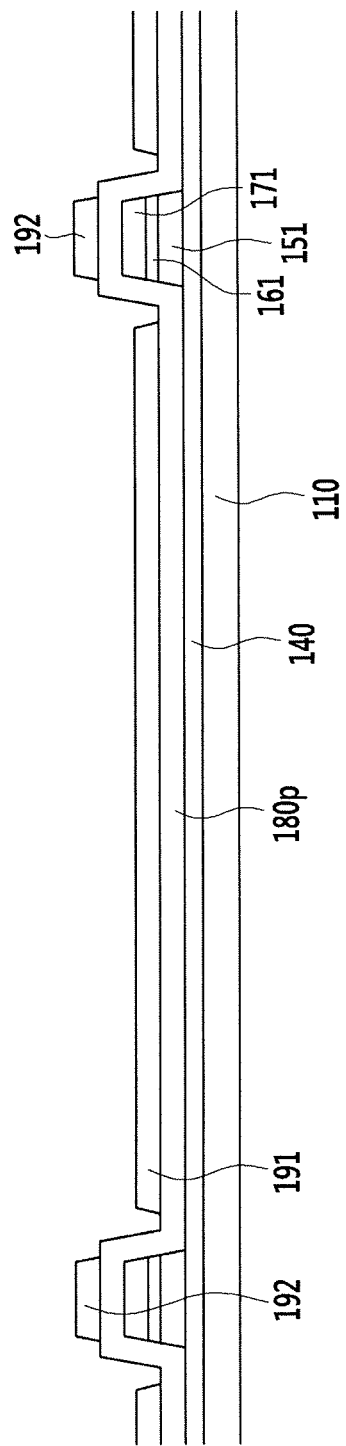
Figure 9:
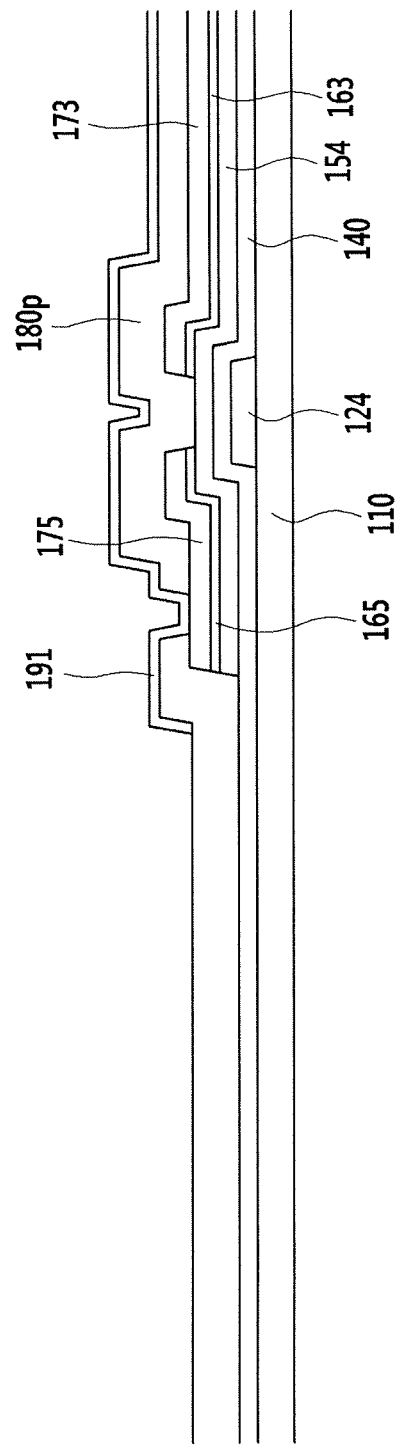

Next, a manufacturing process of a display device according to an exemplary embodiment of the present invention will be described with reference to FIGS. 4 to 9. FIGS. 4, 6, and 8 are cross-sectional views taken along line II-II' of FIG. 1 during a manufacturing process according to an exemplary embodiment of the present invention. FIGS. 5, 7 and 9 are cross-sectional views taken along line of FIG. 1 during a manufacturing process according to an exemplary embodiment of the present invention.

First, referring to FIGS. 4 and 5, the gate conductor (the gate line 121, the gate electrode 124, and the wide gate pad 129) is formed on the insulation substrate 110, and the gate insulating layer 140 is laminated thereon.

As shown in FIGS. 6 and 7, the semiconductor 151 and 154, the ohmic contacts 161, 163 and 165, and the data conductors (the data line 171, the drain electrode 175, and the data pad 179) are formed on the gate insulating layer 140.

Next, as shown in FIGS. 8 and 9, the first insulating layer 180p is deposited on the data line 171, and the opening 185a exposing a portion of the drain electrode 175 is formed.

The gate insulating layer 140 is etched such that the wide gate pad 129 and the data pad 179 are exposed.

Next, the conductive layer including the transparent conductive oxide such as, for example, ITO and IZO, is deposited and etched to form the pixel electrode 191 and the shielding pattern part 192.

As shown in FIG. 9, the pixel electrode 191 is electrically and physically connected to the drain electrode 175 exposed through the opening 185a, and the shielding pattern part 192 is formed to cover the data line 171, as shown in FIG. 8.

In an exemplary embodiment, the pixel electrode 191 is formed to have a planar shape, and the shielding pattern part 192 is formed with a shape that extends in the length direction to cover the data line 171. For example, according to exemplary embodiments, the shielding pattern part 192 has a planar shape that resembles that of the data line 171, is independently formed for each pixel, and may have a larger width than the width of the data line 171 such that it covers the data line 171.

Next, the second insulating layer 180q is deposited on the pixel electrode 191 and the shielding pattern part 192, and the common electrode 270 having a plurality of branch electrodes 273 and the shielding electrode 274 are formed thereof, thereby forming a display device having the thin film transistor array panel having the structure of FIGS. 2 and 3.

According to typical manufacturing processes of a thin film transistor array panel, a pinhole may be generated in the insulating layer when forming the common electrode on the insulating layer. As a result, the common electrode and the data line may be shorted through the pinhole. However, in a manufacturing method of a display device according to exemplary embodiments of the present invention described herein, although a pinhole may be generated through the shielding pattern part 192 protecting the data line 171, only the common electrode 270 and the shielding pattern part 192 may be connected, and the common electrode 270 and the data line 171 may be prevented from being shorted. As a result, a display device having improved stability and reliability may be provided.

Figure 10A:
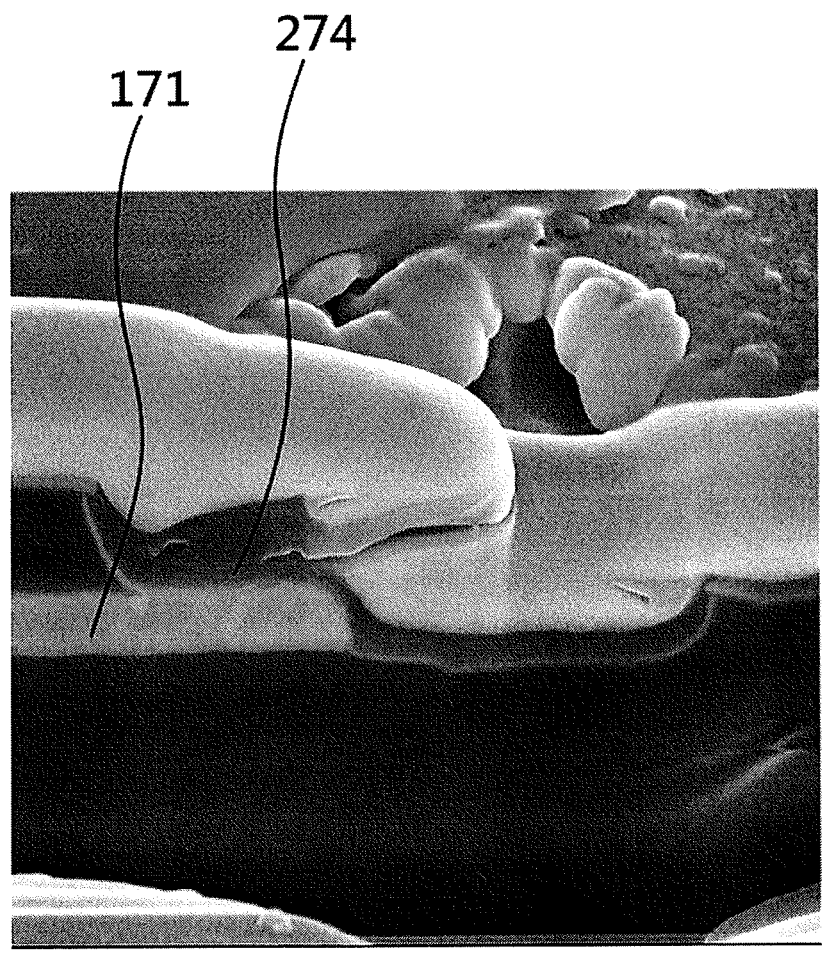
FIGS. 10A to 10C are cross-sectional images of a thin film transistor array panel.
Figure 10B:
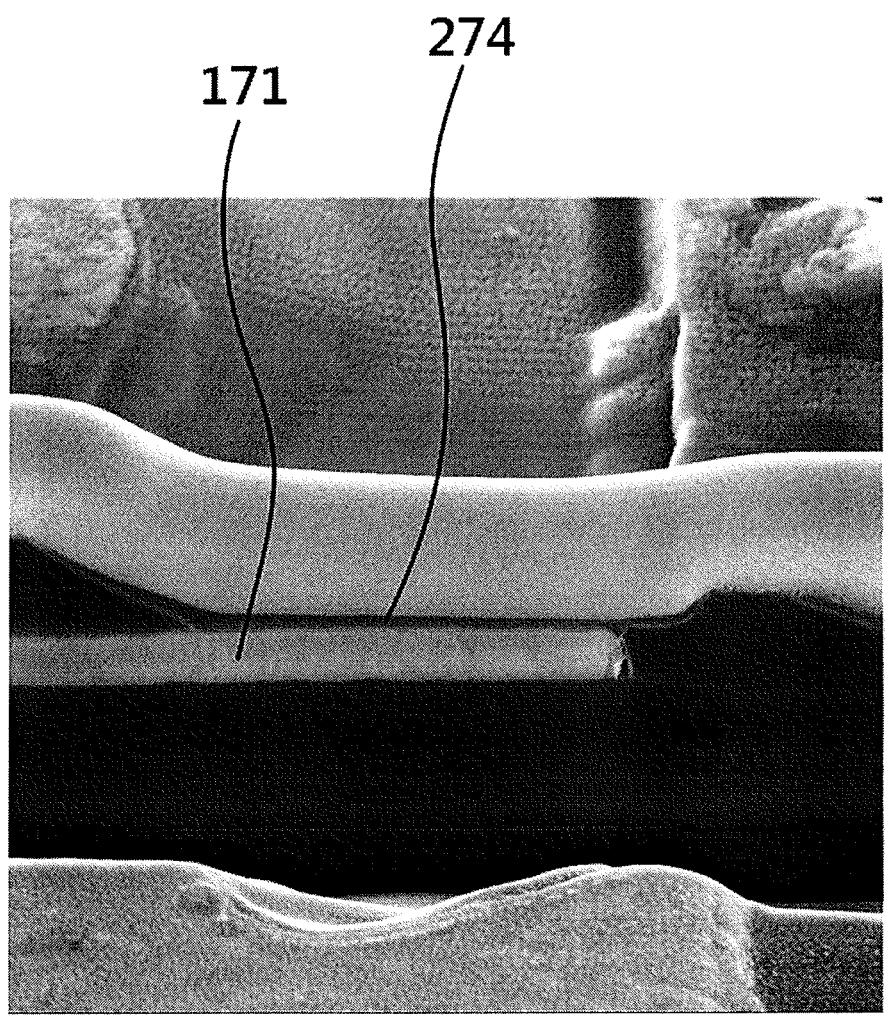
Figure 10C:
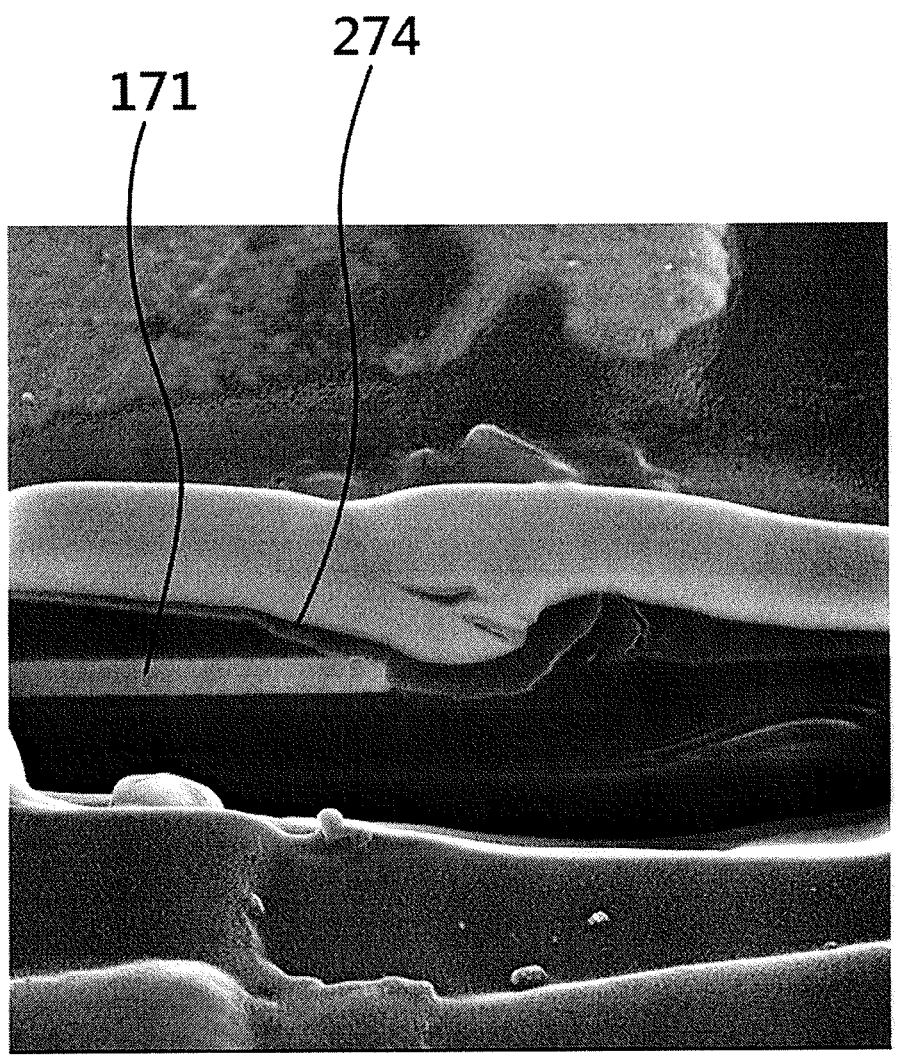

Next, a thin film transistor array panel according to a comparative example will be described with reference to FIGS. 10A to 10C. FIGS. 10A to 10C are cross-sectional images of a thin film transistor array panel according to the comparative example.

As shown in FIGS. 10A to 10C, the data line 171 and the common electrode 270 (e.g., the shielding electrode 274 of the common electrode 270) may be connected to each other through the pinhole formed in the insulating layer. As a result of this fault, the reliability and the stability of the display device may be decreased.

However, according to the exemplary embodiments of the present invention described herein, the data line 171 and the common electrode 270 may be prevented from being connected to each other through the shielding pattern part 192 disposed on the data line 171, and a display device having improved stability and reliability may be provided.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display device, comprising:
   a first insulation substrate;
   a gate line disposed on the first insulation substrate;
   a semiconductor layer disposed on the gate line;
   a data line insulated from and crossing the gate line, wherein the data line comprises a source electrode and a drain electrode facing the source electrode;
   a first insulating layer disposed on the source electrode and the drain electrode;
   a pixel electrode electrically connected to the drain electrode;
   a second insulating layer disposed on the pixel electrode;
   a common electrode disposed on the second insulating layer; and
   a shielding pattern part disposed on a same layer as the pixel electrode and overlapping the data line,
   wherein the shielding pattern part is insulated from the data line with the first insulating layer,
   wherein the common electrode overlaps the shielding pattern part, the data line and the semiconductor layer.

2. The display device of claim 1, wherein a shape of the data line and a shape of the shielding pattern part are substantially similar.

3. The display device of claim 1, wherein a width of the shielding pattern part is larger than a width of the data line.

4. The display device of claim 3, further comprising:
   a second insulation substrate separated from and facing the first insulation substrate;
   a light blocking member disposed on the second insulation substrate;
   a color filter disposed on the second insulation substrate; and
   a liquid crystal layer disposed between the first insulation substrate and the second insulation substrate.

5. The display device of claim 4, wherein the common electrode comprises a shielding electrode, and the shielding electrode overlaps the light blocking member and the data line.

6. The display device of claim 5, wherein a width of the shielding electrode is wider than a width of the light blocking member.

7. The display device of claim 1, wherein one of the pixel electrode and the common electrode has a planar shape and the other one of the pixel electrode and the common electrode has a branch shape.

8. The display device of claim 1, wherein the display device comprises a plurality of pixels, and the shielding pattern part is independently disposed on each pixel.

9. The display device of claim 1, wherein the shielding pattern part is a transparent conductive oxide (TCO).

10. A method of manufacturing a display device, comprising:
    forming a gate line on a first insulation substrate;
    forming a gate insulating layer on the gate line;
    forming a semiconductor layer on the gate insulating layer;
    forming a data line comprising a source electrode and a drain electrode on the semiconductor layer;
    depositing and etching a first insulating layer comprising an opening on the data line and the drain electrode;
    depositing a first conductive layer on the first insulating layer and the opening;
    etching the first conductive layer to form a pixel electrode connected to the drain electrode and to form a shielding pattern part overlapping the data line;
    depositing a second insulating layer on the pixel electrode and the shielding pattern part; and
    forming a common electrode on the second insulating layer,
    wherein the shielding pattern part is insulated from the data line with the first insulating layer,
    wherein the common electrode overlaps the shielding pattern part, data line and the semiconductor layer.

11. The method of claim 10, wherein a shape of the shielding pattern part is formed to be substantially similar to a shape of the data line.

12. The method of claim 11, wherein a width of the shielding pattern part is formed to be larger than a width of the data line.

13. The method of claim 12, further comprising:
    forming a light blocking member and a color filter on a second insulation substrate separated from and facing the first insulation substrate; and
    injecting liquid crystal molecules between the first insulation substrate and the second insulation substrate.

14. The method of claim 13, wherein the common electrode is formed to comprise a shielding electrode overlapping the light blocking member and the data line.

15. The method of claim 14, wherein a width of the shielding electrode is formed to be wider than a width of the light blocking member.

16. The method of claim 10, wherein one of the pixel electrode and the common electrode has a planar shape and the other one of the pixel electrode and the common electrode has a branch shape.

17. The method of claim 10, wherein the display device comprises a plurality of pixels, and the shielding pattern part is formed to be independently disposed on each pixel.

18. The method of claim 10, wherein the shielding pattern part is a transparent conductive oxide (TCO).

19. A display device, comprising:
    a semiconductor layer;
    a first insulation substrate;
    a second insulation substrate separated from and facing the first insulation substrate;
    a data line;
    a pixel electrode electrically connected to the data line;
    a common electrode comprising a shielding electrode;
    a light blocking member disposed on the second insulation substrate;
    a first insulating layer; and
    a shielding pattern part disposed on a same layer as the pixel electrode and overlapping the data line,
    wherein a shape of the data line and a shape of the shielding pattern part are substantially similar in a plan view,
    wherein a width of the shielding pattern part is larger than a width of the data line in the plan view,
    wherein the shielding pattern part completely covers the data line in the plan view,
    wherein a width of the shielding electrode is larger than a width of the light blocking member in an area in which the shielding electrode overlaps the data line and the light blocking member, wherein the shielding pattern part is insulated from the data line with the first insulating layer, wherein the common electrode overlaps the shielding pattern part, the data line and the semiconductor layer.

* * * * *